United States Patent
Popov (10) Patent No.: US 9,727,893 B2
(45) Date of Patent: Aug. 8, 2017

(54) SEARCHING FOR AND CREATING AN ADAPTIVE CONTENT

(76) Inventor: Krasimir Popov, Sofia (BG)

( * ) Notice: Subject to any disclaimer, the term of this patent is extended or adjusted under 35 U.S.C. 154(b) by 384 days.

(21) Appl. No.: 14/236,642

(22) PCT Filed: Aug. 2, 2012

(86) PCT No.: PCT/BG2012/000019
§ 371 (c)(1),
(2), (4) Date: Feb. 3, 2014

(87) PCT Pub. No.: WO2013/016781
PCT Pub. Date: Feb. 7, 2013

(65) Prior Publication Data
US 2014/0164116 A1    Jun. 12, 2014

(30) Foreign Application Priority Data
Aug. 4, 2011 (BG) .......................... 111008

(51) Int. Cl.
*G06F 7/00* (2006.01)
*G06F 17/30* (2006.01)
*G06Q 30/02* (2012.01)

(52) U.S. Cl.
CPC ... *G06Q 30/0256* (2013.01); *G06F 17/30616* (2013.01); *G06F 17/30699* (2013.01); *G06F 17/30867* (2013.01); *G06Q 30/0255* (2013.01)

(58) Field of Classification Search
CPC ........ G06F 17/30699; G06F 17/30616; G06F 17/30867; G06Q 30/0256; G06Q 30/0255
USPC ............... 707/711, 741, E17.014, 723, 736
See application file for complete search history.

(56) References Cited

U.S. PATENT DOCUMENTS

| | | | |
|---|---|---|---|
| 6,263,447 B1 * | 7/2001 | French | G06F 21/31 380/30 |
| 8,301,894 B2 * | 10/2012 | Malkin | G06F 21/64 713/161 |
| 2008/0252611 A1 | 10/2008 | Min et al. | |
| 2009/0216746 A1 | 8/2009 | Aubin et al. | |
| 2009/0276413 A1 * | 11/2009 | Uchida | G06F 17/30725 |
| 2011/0071988 A1 * | 3/2011 | Resch | G06F 11/1076 707/691 |

FOREIGN PATENT DOCUMENTS

EP      1783640 A2    5/2007

* cited by examiner

*Primary Examiner* — Md. I Uddin
(74) *Attorney, Agent, or Firm* — Inventa Capital PLC (57) ABSTRACT

The invention consists of a set of methods and systems, which comprise a unified approach for an identification and/or searching for information and/or content in data bases and/or the Internet on the basis of direct or indirect characteristic features of the users of the information and the content which are being searched for and/or used as well as an automatic generation of electronic content conforming to the characteristics of its future users.

15 Claims, 3 Drawing Sheets

SEARCHING FOR AND CREATING AN ADAPTIVE CONTENT

FIELD OF TECHNICS

Basically, the present invention relates to computer-based methods and systems for searching for and/or identifying information and content in data bases and in the Internet, based on direct or indirect characteristics of the users of the information and the content which is searched for and/or used as well as the automatic generation of electronic content conforming to the characteristics of its future users, including usage by intelligent systems.

BACKGROUND ART

There exists a rich variety of systems and methods used for the identification of information and content, basically in the Internet, which categorize the information and content in descending order on the basis of the fullest conformity to key words, the highest frequency of repeatability of the key words in the information content, largest number of visits and/or a prior exposition paid for the purpose advertisement. There are systems and methods where the presentation of an advertisement exposition and/or information and/or content is made to comply with the geographical location, the use of a given language and/or a statistical analysis of the sites visited by the user searching for the information. Usually, the so-called "search machines" realize this process via the indexation of the objects located in the environment where the search is being conducted. In existence are systems and methods which, in the course of the search, take account of the individual characteristics of the user, or the group of users, searching for the information. Other methods give the users of information and content the opportunity to vote for their quality, making—in this way—a kind of rating of the used information and content which can be taken into account by the search machine during a later search sequence.

Until the present point in time there is no known system and/or method which grants the possibility where in the process of searching with key words and/or elements of a content the objects found—information and/or content—to be identified and arranged in order of their priority by taking account not only of the relative weight of the conformity of the key words and/or elements of the content to the data, associated with the required object and the rating of the content but also to take into consideration the number and characteristics of the other users, who have previously used the same information and/or content. The use of such a system and/or method for identification and/or prioritization of objects in a computer-based environment, like Internet, will give users the opportunity to obtain—when searching for and/or using—information and content which conform not only to the entered key words and/or elements from the content but also to the frequency of prior visits by other users whose interest the searching user considers as relevant to his/her own. On its part, this will lead to shortening of the search time and a priority arranged presentation of information and content to the attention of the user which coincide most with his/her interests. In addition, the irrelevant information and content will be automatically dropped from the set of priorities.

The indexes, which are used in the process of realizing the proposed methods and systems (meta-data associated with objects in the operative environment), offer the opportunity to take into consideration the characteristics of the future users in the process of the automatic generation of electronic content, like translations, text, etc.

The proposed methods and systems offer the capability for a more target-oriented positioning of advertisements with the possible search objects by taking into account the characteristic features of the target group, using these objects, as well as a more detailed approach to the price formation effort when presenting the advertisement with the searched object depending on the frequency of the visits by users who are members of the group of people, targeted by the advertisement message.

The methods and systems offered may be used for the creation of intelligent systems for evaluation of the incoming information flows on the basis of the characteristic features of its creators and/or users and vice-versa—after a statistical analysis of the incoming information flow to find its creators and/or users by default. In addition, via the present invention, intelligent systems may generate an automatic content, consistent with the characteristics of its possible users.

DETAILED DESCRIPTION

The invention consists of a set of methods and systems, which comprise a unified approach to the identification and/or searching for information and/or content in data bases and/or the Internet on the basis of direct or indirect characteristic features of the users of the information or the content, which are being searched for and/or used, as well as an automatic generation of electronic content conforming to the characteristics of its future users.

The detailed description of the methods and systems, presented further down, does not restrict the invention. Part of it makes reference to accompanying figures, the purpose of which is to visualize at least a part of the text of the description without being, in themselves, exhaustive. In the description, frequent mention is made of a user's computer device. This device could be of any type: a personal computer, a laptop, i-pad, mobile phone or whatever computer or communication piece of equipment, which is capable of performing computer-executable methods. The description also includes the use of the notion of "object", which may be any autonomous electronic content such as web-sites, documents, audio and video files, texts, words, parts of audio and video files, cachinnated documents, etc., which can be identified and addressed via computer-executable methods for the purpose of their future use. The computer-based environment of interconnected computer devices may imply any kind of network of connected computer devices which creates the possibility for the transfer of data between them—like a local network (LAN), wide area network (WAN), a telephone-based network, Intranet, Internet or a combination of networks of connected computer devices.

Figure 1:
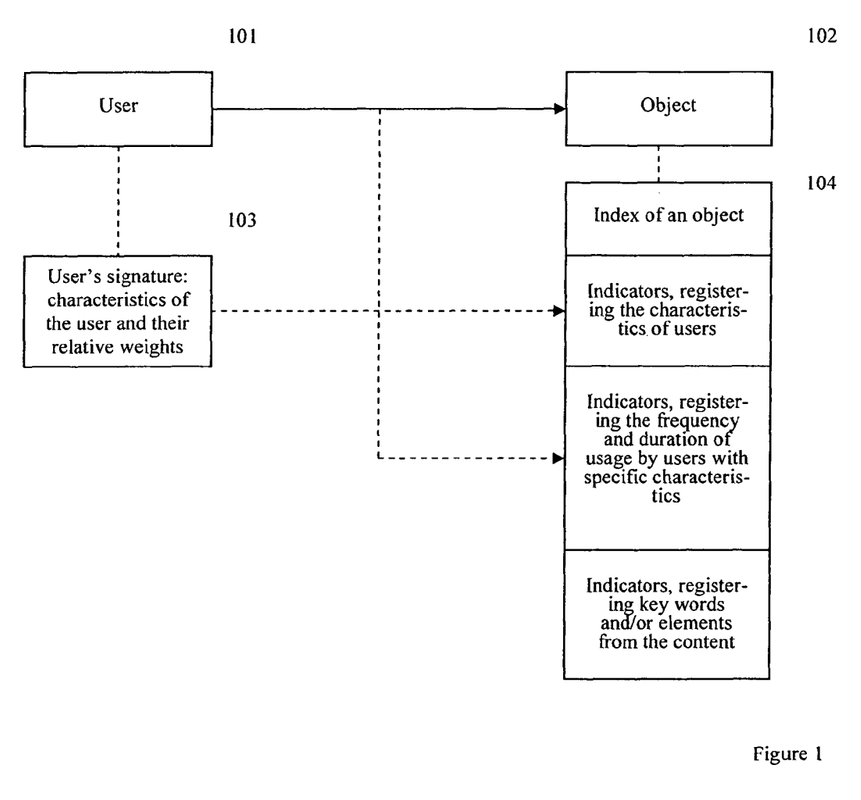
FIG. 1 This figure shows a plan of the interconnections when indexing an object in conformity to the characteristics of the users in a data base and/or a common computer-based environment, like the Internet, made up of computer devices.

(I) A computer executable method is being presented for indexation of objects located in data bases and/or a computer-based environment of interconnected computer devices based on the characteristic features of their users in view of the future use of the created indexes and/or indexed objects for varying purposes, connected to machine processing (FIG. 1).

In order to realize the invention, a computer-executable indexation of objects (102) is conducted via an operator's server as per the method.

A user's signature is created (103), and in essence it is a set of data associated with the user (101), containing user's characteristics as well as their relative weight within a set range—for example between 0 and 1. The user's signature contains characteristic features like sex, age, education, profession, specialty, scientific rank, geographic location, belonging to a given group and/or forum within the environment, etc. The user's signature (103) may be entered by the user him/herself (101) via an interface, suitable for the purpose, on a computer device; it may also be generated by default via an automatic collection of existing and accessible data in the user's environment (101), for example such which are available in forums, social networks, electronic mail and others, including via indexing robots which operate under rules created in advance and index the user (101), associating data containing found characteristics to the user him/herself (101) in the form of his/her machine-created signature (103). It is also possible that in the case of machine-created signatures (103) a feedback connection is established with the user (101), via an interface suitable for the purpose, on a computer device for confirmation of the signature (103) or correction of the derived characteristics and/or their relative weights. A single user (101) may create and use more than one signature (101) for various purposes and many users (101) may use one and the same signature (103) as well. The list of characteristics, without loss of unity, may be presented as a string in which special dividers separate one characteristic feature from another. For the execution of the method, the meaning of the characteristics is of no relevance nor is the method of presenting the characteristics in strings of any importance. For the method to be executed it is of no importance whether the presented signature (103) is that of the user (101), who finds and uses an object (102), or that of another user; whether the signature (103) is specially created for the realization of a concrete task or it is permanently connected with a given user (101).

An index of an object is created (104), which in actuality consists of meta-data associated with an object (102), located in the environment and containing indicators registering data on characteristics of users who have used an object and/or data on the frequency and/or duration of the usage made of a given object by users (103) possessing specific characteristics. The indicators in an object's index (104) may be the characteristics of users (101), like sex, age, profession, etc. For each indicator there is a set value. It is possible that the index of an object (104) may contain additional indicators from the technological level, like data on key words and/or elements from a content. The index of an object (104) may also contain meta-data associated with the object (102), consisting of results from the analysis of the content and/or indicators, containing evaluations and/or qualifications and/or annotations from users (101).

The indexes of objects (104) are updated in each case when the object (102) is used by a user (101) with a signature (103), where to the index (104) of each used object (102) indicators will be added which are a part of the characteristics in the signature (103) of the user (101), but which do not conform to indicators, included in the index of the object (104) and the values of the counters for the use of all indicators participating in the index of the object (104) and which are consistent with the characteristics in the signature (103) of the user (101) increase and the relative weights of the separate characteristics are taken into consideration if such have been defined in the signature (103). The increase in the value of a concrete indicator may, for example, be a function of the frequency and duration of usage of the object (102) multiplied by the relative weight within the 0-1 range of the characteristic, entered in the signature (103) when the object (102) is used by a user (101) with an available characteristic in its signature (103), conforming to the respective indicator.

In cases when the user (101) refuses to use an indexed object (102) via an use of means for refusal integrated in the interface of his/her computer device, the values of the counters may not increase but rather may even decrease in reflection of the use of all indicators participating in the index of the object (104) and are conforming to the characteristics in the signature of the user (103) by taking account also of the relative weights of the separate characteristics if such have been defined for the signature (103).

There is another possible approach. For example, within a separate group of indicators for refuse in the index of the object (104) is reflected an increase in the values of the counters for the use of all indicators which participate in the index of the object (104) and conform to characteristics in the signature of the user (103) and the relative weights of the separate characteristics are taken into consideration if there are such set for the signature (103) and addition to the index (104) of each refused object (102) of the indicators which are part of the characteristics of the signature of the user (103) but which do not conform to the indicators, included in the index of the object (104) is implemented. Practically, this is a creation of a set of indicators in the index of an object (104) with characteristics, frequency and duration of usage until the refusal by users (101) who have declared their refusal to use the object. By possessing the indicators, reflecting the characteristics, frequency and duration of use by the users (101) as well as indicators reflecting the characteristics, the duration of the use until the refusal as well as the frequency of use until the refusal by users (101) who have declared such, could be realized an algorithm for establishment of a rating of an indexed object (102), where the rating will change at every use or refusal to use and is stored together with the identification of the object (102) in a data base located at the operator as per the method and/or on a computer device at the object (102) as a part of the index of an object (104).

For the realization of the method for various purposes, each indicator as per the method may be indexed in the same way as indexing a key word and may individually identify the object (101). Usually, under index one is to understand an inverted index which is a key word and/or an element from content and a list of identifiers of documents and/or content where the key word and/or the element from the content is found. The order of the list of identifiers of documents and/or content is of particular importance and is defined by a function for the calculation of the document's rating in relation to the key word and/or element from the content. According to the presented method, when the indexes are used for searching, to the indicators registering the characteristics of users (101) and between—for example—key words and/or elements from the content, relative weights may be entered. These relative weights may be assigned in the form of a digit within the interval between zero and one, where zero indicates the lack of meaning and one will indicate a full meaning.

The indexes of objects (104) and signatures (103) of users (101) are stored together with the respective identification and/or reference for an object (102) and/or user (101) in the data base of the operator as per the method and/or on a computer device at the location of the object itself (102) and/or the user's location (101).

For automatic processing of objects, indexed according to the method, it is possible to apply an algorithm for analysis of an index of an object as a result from the application of which to automatically derive a categorization of an object in accordance to a nomenclature of categories, previously entered in a computer device.

For automatic positioning and formation of the price of advertisements at the location of objects one may also apply an algorithm for the processing of data on the users where the data and the characteristics of the indexes of the objects are used periodically for the precise positioning at the location of an object and valuation of the service—placing of advertisement banners and/or messages depending on the individual characteristics of the target group of users of concrete objects in a common environment.

For automatic positioning and formation of the price of advertisements at a user's location, group of users and/or a forum, one may use the data for the characteristics from the signature of each user and/or summarized for a group of users by periodically applying an algorithm for making of a comparison of their degree of conformity to the indexes of objects which are advertised and as objects for advertisement could be derived objects which have a maximum degree of usability by users having characteristics conforming to greatest degree with those of the users where the advertised objects are positioned.

The invention may also be used for the conducting of a feedback between users of concrete objects and their creators and/or operators, where the data contained in the indexes of objects are used as a source of concrete information for making their contents precise and/or an algorithm is applied for the automatic analysis of the data contained in the indexes of objects and recommendations are derived for making the contents precise in conformity to the specifics of the users.

Figure 2:
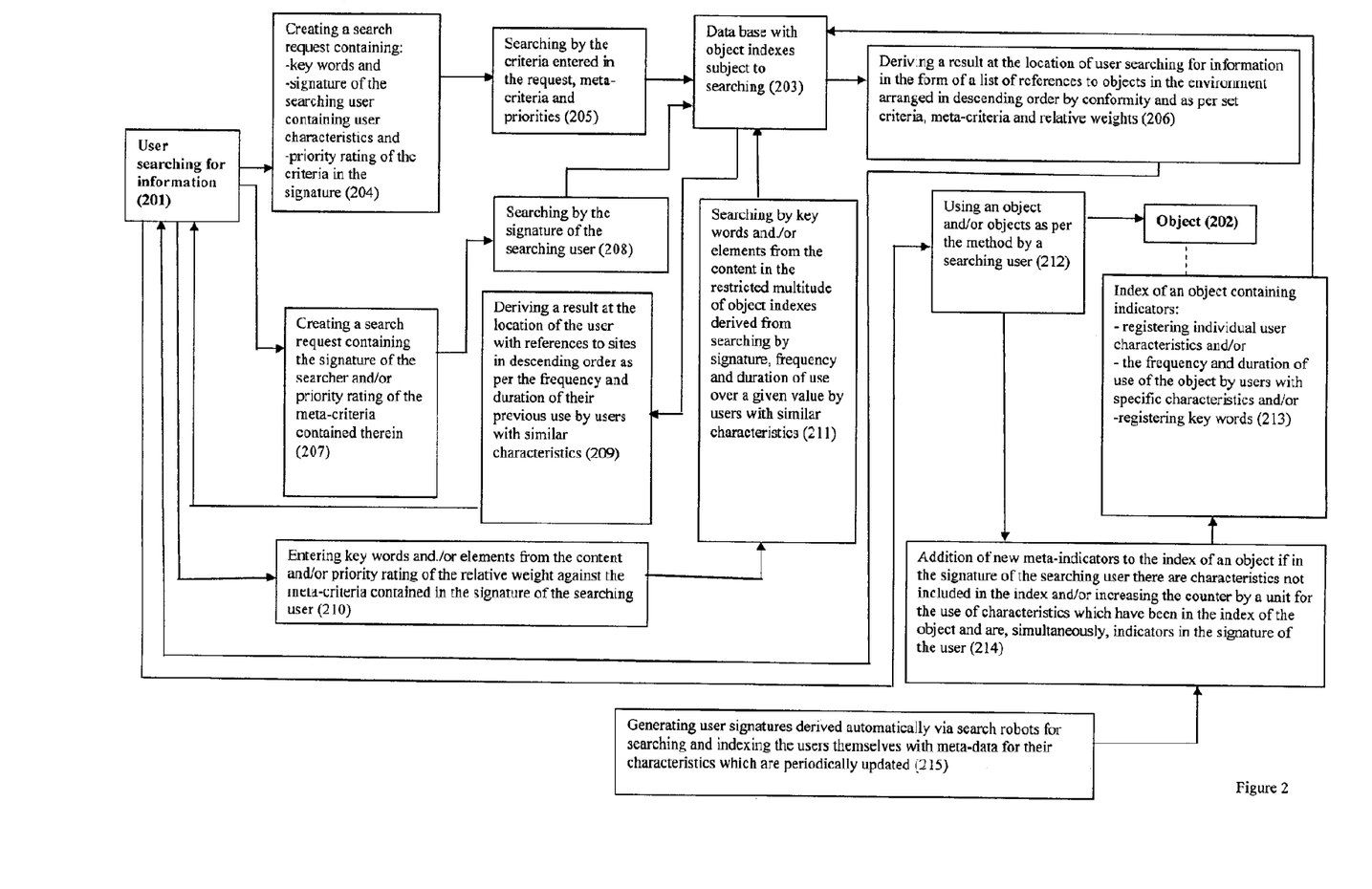
FIG. 2 This figure presents a description of the basic stages in the realization of a method for searching for objects conforming to the characteristics of the user in a common computer-based environment, like the Internet, made up of computer devices.

(II) A computer-executable method for searching objects like information and/or content which correspond to the characteristics of the searching user is presented (FIG. 2). The method is implemented in data bases and/or in a common computer-based environment comprised by connected computer devices.

To start the search, a search based on a signature is requested (207) in a suitable interface on a computer device of the user (201) and/or when using computer-executable applications which are presuming it, by default the process is starting automatically. The signature of the user (207), for the purpose of searching is, in practice, a compilation of meta-criteria for searching, because as a difference from the usual search criteria—like key words for example—the characteristics in the signature (207) do not relate to the content of the searched object (202) but only and singularly to its users (their characteristics, frequency and duration of the use of the object by users possessing certain characteristics). In other words, the searching based on the signature of a user (207) is, practically, a search which is not based on criteria connected with the content of the searched object (202).

The meta-criteria, which are used for the realization of the method and which are the signature (207) of the user (201), may be created via a selection from a standardized nomenclature of standard characteristics but they also may be made up of a free text or texts split by a divider. The standardized nomenclature has the advantage of not being effected by the local language and to produce results, influenced by a large group of users. The free texts offer the chance to employ results from small and specific communities. In addition to permanent characteristics, like sex, profession, hobby, age, family status, etc., the signature (207) may include the current status or the emotions of the user (201). For example "I am bored", "I am tired", "I am happy", "I am on a trip". A simple signature (207) may be the e-mail of the user (201), especially if it is corporative (the deriving of the domain as a separate meta-criterion will lead to suitable results for the personnel of the company); it may be the name of the favorite football team, political party, etc. The signature (207) may be a mixture of standard values, as per the nomenclature, and free texts which define groups having informal interests to which the user belongs (201).

A search is conducted (208) among the indexes of objects (213) which are usually stored in a data base (203) at the operator's location as per the method, based on the characteristics of the user (201) in the signature of the user (207). Next, a ranking of indexes of objects (213) is performed via the application of an algorithm for ranking process, depending on the characteristics in the signature of the user (207), the values of the indicators in the indexes of objects (213) and, if applicable, the predefined relative weights of the separate characteristics in the signature of the user (207). The result from the search (209) is presented in a suitable interface on a computer device of the user (201) in the form of a list of references to objects and/or the objects themselves and/or their annotations according to the ranking order of the indexes associated with them. In establishing results from the search (209), which do not satisfy the user (201), a feedback is performed via the interface for entering the signature (207) by adding to and/or eliminating characteristics, consistent with the user (201) and/or changing the relative weights of characteristics and/or selecting a different his/her signature (207) and the steps, already described are repeated, until the searched object is being found (202) or until it is established that such does not exist.

The method may be conducted in a combination with a search by key words and/or elements from the content as well. In this case the user (201) enters a request for searching by key words and/or elements from the content (210), in a suitable interface on the user's computer and enters a relative weight of the selected criteria for searching against his/her own signature (207) and/or such is being derived automatically on the basis of rules, set in advance. A search is conducted in a multitude of ranked indexes of objects (213), derived after the ranking procedure by signature (207) for the availability of objects (202) with indexes (213) containing indicators like key words and/or elements from the content. A search is conducted (211) among the indexes (213) containing indicators, like key words and/or elements from the content by the key words and/or elements contained in the request for the search (210). A ranking of the indexes is performed on objects (213) containing indicators, like key words and/or elements from the content via the application of an algorithm for ranking as per the search criteria (210), the indicators in the indexes of the objects (213), containing key words and/or elements from the content and the set relative weight of the search criteria (210) against the signature (207) of the user. The result from the search (206) is presented in a suitable interface on a computer device of the user (201) in the form of a list of references to objects (202) and/or the objects themselves (202) and/or their annotations according to the ranking order of the indexes (213) associated with them. In establishing results from the search (206), which do not satisfy the user (201), a feedback is performed, via the interface for entering the request for the search (210), by adding to and/or eliminating key words and/or elements from the content and the above-described steps are repeated until the searched object is found (202) or until it is established that such does not exist.

It is possible that initially only a search by key words is conducted and/or by elements from the content after which, among the derived multitude of rating indexes of objects (213) containing indicators like key words and/or elements from the content, a search of objects (202) will be conducted with indexes (213) containing indicators like user characteristics and after finding such, a search, based on the signature to be performed, where in applying the algorithm for the rating and deriving the final result (206) is taken into consideration the entered and/or previously set relative weight of the criteria for searching against the signature of the user (201).

The search may also be conducted with one search request only (204), which contains the signature of the user (201) and key words and/or elements from the content entered with a given relative weight between them. A search is performed (205) by the entered criteria and meta-criteria in the data base (203) with indexes of objects (213). An algorithm for the rating of the indexes is applied (213), conforming to the characteristics in the signature of the user (201), the entered key words and/or elements from the content and the indicators of the indexes of the objects (213) by taking into consideration the defined relative weights of the search criteria against the signature. A result is derived (206), which is presented in a suitable interface on a computer device of the user (201) in the form of a list of references to objects (202) and/or the objects themselves (202) and/or their annotations according to the ranking order of the indexes (213) associated with them. In establishing results from the search (206), which do not satisfy the user (201), a feedback is performed via the interface for entering the request for the search (204), by adding to and/or eliminating key words and/or elements from the content and/or characteristics in the signature and/or relative weights of characteristics and/or another signature is selected and the above-described steps are repeated until the searched object is found (202), or until it is established that such does not exist.

The deriving, simultaneously and consecutively, of the results from the search by signature and the results from the search by signature an by key words and/or elements from the content or the results from the search by key words and/or elements from the content and the results from the search by signature and by key words and/or elements from the content on a suitable interface is possible at a computer device of the user.

The method can be also applied by deriving the characteristics in the signature of the user by default, after the application of an algorithm for analyzing the indicators in an index of one or more contents similar to the searched one and to generate, via a machine, a signature of user with characteristics similar to the characteristics of the users who have most frequently used the indicated content or contents.

Figure 3:
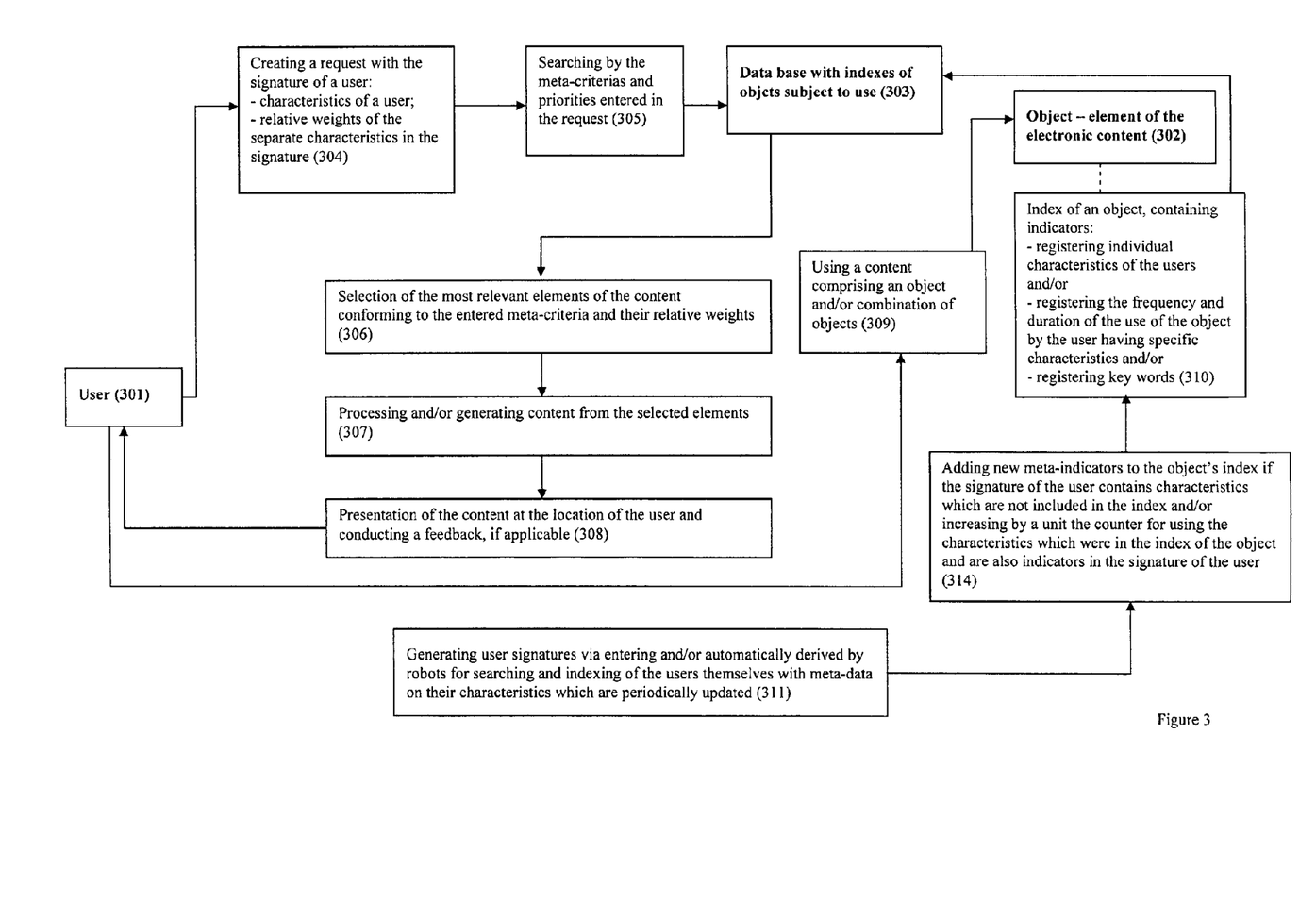
FIG. 3 A description is presented of the basic stages in the realization of a method for the processing and/or generation of an electronic content, conforming to the characteristics of the user in a common computer-based environment, like the Internet, made up of computer devices.

(III) A computer-executable method is presented for processing and/or generation of texts and/or audio and/or video files (content), in conformity to the characteristics of the user and located in a data base and/or in a common computer-based environment for exchange of data, consisting of numerous computer devices connected between each other (FIG. 3).

For the realization of the method, objects (302)—like a word, text, image and in general autonomous part of an electronic content, are indexed as per the invention. A processing and/or creation of a content by signature (304) is requested in a suitable interface on a computer device of the user (301) and/or by employing computer-executable applications which presume such and by default the process is started automatically. A search is conducted (305) among the indexes of the objects (310) usually contained in the data base (303) at the operator's location as per the method and based on the characteristics of the user's signature (304). A ranking of the indexes of objects (310) is implemented via the application of a ranking algorithm, taking into consideration the characteristics of the user's signature (304), the values of the indicators in the indexes of the objects (310) and the previously set relative weights of the separate characteristics. As a result from the ranking procedure, the most relevant objects are derived (306) and from these, via a suitable algorithm, an electronic content is created (307), processed and/or generated, which is conforming to highest degree to the characteristics in the user's signature (304). The result (308) is presented, via a suitable interface, on a computer device of the user (301). In the process of creating a processed and/or generated electronic content, which does not satisfy the user (301), a feedback is initiated via the interface on the user's computer device (301) by adding and/or eliminating characteristics in the signature of the user (304) and/or changing the priorities with a repetition of the steps described above until the creation of a content of acceptable quality or until it is found that this is impossible.

The method may also be realized where the characteristics in the signature of the user are derived by default after an application of an algorithm for analysis of the indicators in an index of similar indicated content or contents and machine generation of a user's signature with characteristics similar to the characteristics of the users of the indicated content/contents.

(IV) The above-described methods may be realized with the help of a system, consisting of one or more connected devices and one or more computer devices connected to them, which contain:

means for indexing of an object and for creation of a user's signature and means for searching by a user's signature, application of an algorithm for ranking of indexes of objects according to the characteristics in the signature and/or their relative weights and the indicators in the index and presentation of the results on a computer device at the user's location, other than the server, and realization of a feedback connection if applicable and/or means for searching by signature and entering and searching by key words and/or elements from the content, application of an algorithm for ranking indexes of objects, containing key words and/or elements from the content, in conformity to the criteria in an entered request, the indicators of the indexes and the defined relative weights between the requested criteria and the user's signature and presentation of the results on a computer device at the user's location, other than the server, and realization of a feedback connection if applicable and/or means for processing and/or generation of texts and/or audio and/or video files, requesting for processing content based on a user's signature, application of an algorithm for ranking indexes of objects according the set characteristics and/or the relative weights between them and the indicators of objects, deriving the most relevant objects, processing and/or generating of electronic content and realization of feedback if applicable and/or means for application of an algorithm for analysis of an index of an object, for deriving the categorization of an object in accordance to a nomenclature of categories, entered in the computer device in advance and for automatic processing of the object and/or means for automatic positioning and price formation of an advertisement at the objects, localized in a common computer-based environment of connected computer devices, such as Internet, and application of an algorithm for processing of data for the users from the indexes of the objects and/or means for automatic positioning and price formation of an advertisement at the objects, localized in a common computer-based environment of connected computer devices, such as Internet, and application of an algorithm for comparing the characteristics contained in the user's signature based on the degree of conformity to the indexes of objects, which are being advertised, for deriving at the user's location of the most relevant advertised objects by the extent of usage by users having similar characteristics and/or means for creation of a feedback between the users of concrete objects in a common computer-based environment and their creators and/or operators offering the opportunity to use the data contained in the indexes of objects as a source of concrete information for making their contents more precise and/or application of an algorithm for automatic analysis of the data, contained in the indexes of objects and deriving of recommendations for specifying their content conforming to the specifics of the users.

EXAMPLES FOR IMPLEMENTATION

The invention may be used for searching the Internet for information and/or content in conformity to the characteristics of the user. The user will open a web-based site, created by an operator as per the method, and will search by a signature and by key words and/or elements from the content. The site has access to a standard nomenclature of indicators and grants the opportunity, via a selection, to form a request for a search based on the signature of the user. The site also offers the possibility to create a signature in a text field by registering a free text with dividers. It is possible that no selection from a standard nomenclature is made and/or that no text is entered. The signature may be an empty string—as is currently the well-known search method.

The site will return the request for searching with a signature back to the user as a string with dividers. The user may retain the signature for future usage. One user may form and use a number of signatures as per the present method. In case of a lack of a signature /when the signature is an empty string/ and when it is anticipated that the searched object have to conform to the individual characteristics of the searching user, there is a possibility for an automatic deriving of the characteristics of the concrete user from publicly accessible data or via investigation of his/her working behavior and thus creating a signature of the user automatically or after realization of a feedback with the said user for conformation and/or correction. After the creation of the signature, the user will enter the key words and/or elements from the content by entering also the relative weight of the signature against the key words and/or the elements from the content or otherwise such will be derived as per rules set in advance. A search will be conducted among the indexed objects in the user's data base as per the method. An algorithm for a rating of the indexes will be applied according to the characteristics of the signature, the search criteria and the indicators in the indexes of the objects and the search site will show the result in the form of a list of references to the objects and/or the objects themselves and/or their annotations arranged in descending order according to the ratings of the indexes, associated to them. If the user is not satisfied with the results, a feedback may be run with the addition or elimination of key words and/or elements from the content and/or a change of the characteristics will follow in the signature and/or a selection of another signature and the search will be repeated until finding the requested information and/or content or until it is established, that such does not exist.

The realization of the indexation of meta-information for a previous use of the object, together with characteristics of the object, may be executed in several different ways.

One such way is to add, to the existing indexed objects in the data base of the search machine, meta-information on the users who have used the object. The addition may mean the addition of a meta-text to the object. This meta-text will contain each new meta-criteria found in the signature of a user serving as an indicator. The meta-text will be indexed together with the object. The search will be conducted by "gluing", to the user's request for searching, the signature of the user and this will now form the new search request. In view of the need to economize, it is possible to refrain from adding a meta-text to the object but rather to index the meta-indicators identifying the object, for example, by using the registration number of the object within the system.

Another possible way is to have a separate operator to keep an index of the used meta-indicators. The index will indexate the objects using their URL; the operator receives the user's request and a user's signature, sends the user's request to a regular search machine and the obtained results will be rearranged according to the criteria in the user's signature, the indicators in the indexes of objects as per the method and the set relative weights after which the results will be delivered to the user.

As with all normal searches, the frequency of use and the duration effect the rating of given object for a given meta-indicator.

In the practice usually, the results from a given search are stored for future use /cachinnating the requests/. Employing this work method means that the search is first performed in the texts of requests, already completed, and in the case of luck the results will be readily derived. To be successful, the method disclosed should also be applied to the cachinnated requests, where such a request is considered as an indexed object /the text of the request/, which should acquire additional indexation according to the method for the meta-criteria found in the user's signatures. From the point of view of occupied memory this will be the more efficient option but if memory is of no particular consequence the results from the search of the users requests, plus the signatures, may be cachinnated directly.

The invention may also be used in the cases when a user needs to conduct a search based only on his/her own signature. In this way, for example, should the search involve medical literature and the user has set the specialty of medicine with a certain profile as a criteria in the signature, the suitable interface will show—in descending order by coincidence—the materials which are most often used by the specialists in the given sphere with the profile, set by the searching user. In this way—and without losing time—the user will obtain the object, which is most relevant to his/her needs.

The invention may be used in forums for searching and automatic deriving of objects which are used by groups of people, participating in the forum. For example, if the user has a profile in a forum and is a part of a given group and/or has a group of friends and this is reflected in his/her signature at a certain location, automatic information may be received on the most frequently used objects within his/her sphere of interest in the common environment, like the Internet, by members of the group to which he/she belongs. When a search is conducted, the user may place a criteria in his/her signature, which is connected to friends in the forum and/or the group to which he/she belongs or with a group in general and/or participants in a forum, whose interests are considered by the user as being relevant to his/her own.

The presented invention may be used for the automatic positioning of advertisements at the locations of concrete objects by considering the specifics of the users of the concrete objects from the data contained in the indexes of the respective objects and in this way to achieve a greater degree of accuracy when addressing the message of the advertisement. The statistics, collected in the indexes and related to the usage of concrete objects in combination with the data from the characteristics in the signatures of the users, may also be used for the automatic positioning of advertisements at the users locations and/or their groups and/or forums. This will enhance the adequate positioning in the advertisement strategies of objects which are rarely used, but by users who possess characteristics, conforming to the target groups at which the advertisement message is aimed.

The invention may also be used for the more precise price formation when positioning an advertisement at the location of concrete objects and/or users by taking into consideration the quantity and the characteristics of the users, who have used the advertised object as per the statistics, derived from the indexes of the advertised objects in conformity to the proposed method.

The indexes of objects may also be used as a source of detailed statistics on the quantity and the characteristics of the users of concrete objects in a common environment which—on its part—may serve as a feedback for specifying their contents.

In one of the possible applications of the invention, the signature of the user may be attached to the user's browser and during each utilization of an object in the Internet the signature will "mark" indicators in the index of the respective object which, on its part, will greatly improve statistics and the opportunity for analyzing the use of the objects in the common environment.

The proposed invention may also serve for the indexation of words, texts, sounds, images and, in general, autonomous parts of an electronic content where the data, collected in the indexes, is used for the processing and/or generation—for example—of electronic content for automatic processing of texts for the needs of the automatic translation and/or generation of a text, where the produced translations and generated texts conform to the individual characteristics of the user, based on the frequency and duration of the use of the elements by users having similar characteristics. In this way, when a scientific text from a concrete sphere is automatically translated /for example engineering/, in the process of word selection as well as terms, semantic solutions, etc., use will be made of the most frequently previously used such by users-engineers in the common environment.

In addition, the invention may be used in the process of creating intelligent systems for assessment of the incoming information flow according to the characteristics of its creators and/or users and also vice-versa—after a statistical analysis of the incoming information flow, by default, its possible creators and/or users to be derived. The present invention may also help the intelligent systems to generate automatic content, conforming to the characteristics of its possible users.

The above-quoted examples are given only as an illustration of some of the possible applications of the proposed method and are far from being exhaustive.

APPLICATION OF THE INVENTION

The invention is applicable for the identification and/or searching for information in data bases and/or in a common, computer-based environment, consisting of a multitude of connected computer devices, such as the Internet, on the basis of direct or indirect characteristics of the users of the information and the content which is searched for and/or used. The invention is also applicable for the positioning of advertisements, in conformity to the characteristics of the target group using the information and the electronic content as well as in the process of price formation of the service rendered when positioning the advertisement at the location of a concrete object and/or user in a common computer-based environment. Additionally, the invention may be used for generating statistics, based on the characteristics of the users of concrete objects in a common computer-based environment, after considering the characteristics of its potential users. It can be applied to intelligent systems for the classification of incoming information flows in conformity to the characteristics of their users and/or creators, for the analysis of the content of the information flows and the reverse deriving of the possible characteristics of their users and/or creators as well as for the creation of a content conforming to the needs of its users. The technical realization of the methods may be effected via the creation of a suitable software for their application and/or programming of the functions of the separate components in the systems.

The invention claimed is:

1. A computer-executable method using a non-transitory computer readable medium and for identification of objects, located in data bases and in a common computer-based environment for exchange of data, consisting of a multitude of interconnected computer devices, where the identification of the objects is performed via an indexation of objects, characterized with:

a) creation of a user's signature consisting of data, containing the characteristics of a user which are associated with the user through: entering of user characteristics or free texts as characteristics the user via a suitable interface on a computer device and setting relative weights of the various characteristics of a user, and automatic generation of user characteristics and relative related weights, based on existing and accessible data on its characteristics in the environment and automatic generation of user characteristics and relative related weights, and realization of a feedback for the purpose of confirmation and correction of the created signature via a suitable interface on a computer device;

b) creation of an index of object in the environment, consisting of meta-data associated with the object containing the following indicators: data on the characteristics of the users who have used the object or free texts from their signatures and for each reference to the object in the index, there is data for ranking, including frequency and duration of the usage of the object by users possessing certain specific characteristics;

c) updating of the indexes of objects where, during the use of a given object by a user with a signature:

to the index of each object used, object indicators are added in the same way as indexing a keyword, being the indicators are a part of the characteristics in the signature of the user but which do not comply to the indicators, included in the index of the object; values of counters for using the object which are a part of the records referencing the object in the lists of the indicators are increasing for the indicators which participate in the index of the object and conform to the characteristics in the signature of the user by taking into account the relative weight of the separate characteristics if such are set for the given signature and to the index of each object used is reflected data for ranking, including frequency and duration of the usage of the object by the user;

d) storing the indexes of objects and signatures of users with the respective identification or reference to an object or user in a data base at the operator's location as per the method and on a computer device at the location of the object itself or of the user.

2. Method according to claim 1, where a user creates and uses more than one signature for a user or more than one user utilize one signature where the signatures, associated with the user, are stored in a data base at the operator's location or in a computer device at the user's location, together with the respective identification of the user, while when using an object in the same environment, the user gets the opportunity, via a suitable interface, to select the signature he/she will use or derives such by default via rules, set in advance.

3. Method according to claim 1, where the characteristics in the signature of a user are derived by default after the application of an algorithm for an analysis of the indicators in an index of an indicated by the user content and is implemented a machine generation of a user's signature with characteristics similar to the characteristics of the users of the indicated contents.

4. Method according to claim 1, where the index for an object also contains data associated with the object as indicators, containing key words or elements from the content or containing results from analysis of the content or containing evaluations or qualifications or annotations from users.

5. Method according to claim 1, where when an indexed object is being used by a user with a signature and the last refuses to use again the indexed object by employing a refusal integrated in the interface of the computer device at his/her location:

the values of the counters for the use of all indicators, which participate in the index of the object and which conform to the characteristics in the signature of the user, decrease and consideration is made of the relative weights of the separate characteristics if such are set in the signature or, in a separate group of indicators for refusal, the index of the object reflects an increase in the values of the counters for the use of all indicators which participate in the index of the object and which conform to the characteristics in the signature of the user and consideration is made of the relative weights of the separate characteristics, if such are set in the signature, and are added to the index of each rejected object the indicators which are a part of the characteristics in the signature of the user but do not conform to the indicators included in the index of the object.

6. Method according to claims 1 and 5 where an algorithm is applied for creation of a rating of an indexed object using the indicators in the index of the object related to users who have used the object and such, who have generated refusals and their values, where the rating change during each use and refusal and is stored together with the identification of the object in a data base at the operator's location as per the method or on a computer device at the location of the object as a part of the index of an object.

7. Method according to claim 1 where an algorithm is applied for an analysis of an index of an object using nomenclature of standard characteristics and a categorization of the object is derived as per a nomenclature, set in advance, with categories for an automatic processing of the object.

8. Method according to claim 1 for an automatic positioning and price formation of an advertisement, placed at the object's location, while the object is displayed, via the application of an algorithm for a processing of data for the users where, on a periodic basis, the data and the characteristics from the indexes of the objects are used for the precise positioning at the location of the object and price formation of the service rendered for the placing of advertisement banners or messages conforming to the individual characteristics of the target group of users of concrete objects in a common environment.

9. Method according to claim 1 which includes the conducting of automatic positioning and price formation of an advertisement placed at the user's location, a group of users or a forum, where for the positioning of a concrete advertisement the data from the characteristics will be used as derived from the signature of each user or jointly for a group of users with the periodical application of an algorithm for comparison of the degree of conformity with the indexes of objects which are being advertised and objects for advertisement are being derived having a maximum usability by users with characteristics conforming to the highest degree with those of the users where the objects of the advertisement are positioned.

10. Method according to claim 1 for the creation of a feedback between users of concrete objects in a common computer-based environment and their creators and operators, consisting of the use of data contained in the indexes of objects serving as a source of concrete information for specifying their content and application of an algorithm for an automatic analysis of the data contained in the indexes of objects and deriving recommendations for specifying their contents in conformity to the specifics of the users.

11. A computer-executable method using a non-transitory computer readable medium for searching for information and content which corresponds to characteristics of a searching user in data bases and in a common computer-based environment made up of multiple connected computer devices where a search is conducted of an indexed object characterized with the following steps:
- a) a search based on a signature of a user is initiated, on suitable interface on a computer device of the user or by using computer-executable applications which presume it by default and which starts the process automatically;
- b) a search is conducted, among indexes of objects, based on the characteristics of the user in the signature of the user;
- c) a ranking of the indexes of objects is performed via the application of an algorithm for a ranking process depending on the characteristics in the signature of the user, the data for ranking an object, including frequency and duration, attached to each reference to an object in the lists of indicators in the indexes of objects and the entered relative weights of the separate characteristics in the signature of the user;
- d) a result from the search is presented in a suitable interface on a computer device of the user in a form of a list of references to objects and the objects themselves and their annotations according to the ranking order of preceding step of the indexes associated with them;
- e) in establishing results from the search, which do not satisfy the user, a feedback is performed via the interface for entering the signature by adding to or eliminating characteristics, consistent with the user and a change in the relative weights of characteristics is implemented and a different signature is being selected with a subsequent repetition of the steps, already described, until the searched object is being found or until it is established that appropriate object does not exist;
- f) where the results are derived, simultaneously and consecutively from the search by signature as well as the results from the search by signature and by key words or elements from the content and are shown on a suitable interface at a computer device of the user.

12. Method according to claim 11 for realization of a search of information and content conforming to the characteristics of the searching user by entering key words or elements from the content, where the search for an indexed object is conducted via the following steps:
- a) the user enters a request for searching by key words or elements from the content in a suitable interface on a user's computer and enters a relative weight for the selected criteria for searching against his/her own signature or such is being entered automatically on the basis of rules, set in advance;
- b) a search is conducted in the multitude of ranked indexes of objects, as per claim 11, p. c), for availability of objects with indexes, containing indicators like key words or elements from the content;
- c) a search is conducted among the indexes containing indicators like key words or elements from the content of the identified objects from the previous step by key words or elements from the content contained in the search request;
- d) a ranking of the indexes of objects containing indicators like key words or elements from the content is performed via application of an algorithm for ranking as per the search criteria, the indicators in the indexes of the objects, containing key words, or elements from the content and the set relative weight of the search criteria against the signature of the user;
- e) the result from the search is presented on a suitable interface on a computer device of the user in the form of a list of references to objects or the objects themselves or their annotations according to the ranking order of the indexes associated with them;
- f) in establishing results from the search, which do not satisfy the user, a feedback is performed via the interface for entering the request for the search by adding to or eliminating key words or elements from the content and the above-described steps are repeated until the desired object is found or until it is established that such does not exist.

13. Method according to claims 11 and 12 where initially is performed search only by key words or elements from the content and after that, among the derived multitude of rated indexes of objects containing indicators like key words or elements from the content, a search for objects with indexes which contain indicators like user characteristics is conducted and among those found, a search by signature is performed where for the application of a rating algorithm for deriving the end result a consideration is made of the entered or previously set relative weight of the criteria for searching against the signature of the user.

14. A computer-executable method using a non-transitory computer readable medium for processing or generation of texts or audio or video files conforming to characteristics of a user and located in a data base and in a common computer-based environment for an exchange of data consisting of numerous computer devices connected between each other, characterized by the following steps:
- a) objects, like a word, text, image and any other autonomous part of an electronic content, are indexed;
- b) the processing or creation of a content by signature is requested on a suitable interface on a computer device of the user and by employing computer-executable applications which presume such, by default the process is starting automatically;
- c) a search is conducted among indexes of objects based on the characteristics or free texts of the user's signature;
- d) a ranking of found references to objects in the indexes is conducted via the application of a ranking algorithm conforming to the characteristics or free texts of the user's signature, the data for ranking an object, including frequency and duration, attached to each reference to an object in the list of the indicators, which can be keywords and meta data as user's characteristics and free texts of the user's signature, in the indexes of objects and relative weights of separate characteristics;
- e) the most relevant objects are derived after the ranking of the indexes during the preceding step and from them a processed or generated electronic content is created which conforms to a highest degree to the characteristics of the user's signature;
- f) a result is presented via a suitable interface on a computer device located with the user, wherein the result is derived, simultaneously and consecutively from the search by signature as well as the result from the search by signature and by key words or elements from the content and are shown on a suitable interface at a computer device of the user;
- g) in case of creation of a processed or generated electronic content, which does not satisfy the user, a feedback is performed via the interface on a computer device of the user by adding to or eliminating characteristics in the signature of the user and changing priorities with a subsequent repetition of the steps, already described, until a content with acceptable quality is being created.

15. A system having a non-transitory computer readable medium and comprised of: One or more server devices and one or more computer devices, connected to them, which contain: means for indexing of an object and for creation of a user signature and means for searching by a user's signature, application of an algorithm for ranking of indexes of objects according to the characteristics or free strings in the signature of a user and their relative weights and the indicators in the index and presentation of the results on a computer device at the user's location, other than the server, and realization of a feedback connection and means for searching by signature and entering and searching by key words or elements from the content, application of an algorithm for ranking indexes of objects, containing key words or elements from the content, in conformity to the criteria in an entered request, the indicators of the indexes and the defined relative weights between the requested criteria and the user's signature and presentation of the results on a computer device at the user's location, other than the server, and realization of a feedback connection if applicable, and wherein the results are derived, simultaneously and consecutively from the search by signature as well as the results from the search by signature and by key words or elements from the content and the results from the search by key words or elements from the content and the results from the search by signature and key words or elements from the content, and are shown on a suitable interface at a computer device of the user, and means for processing or generation of texts or audio or video files, requesting for processing content based on a user's signature, application of an algorithm for ranking indexes of objects according the set characteristics and the relative weights between them and the indicators of objects, deriving the most relevant objects, processing or generating of electronic content and realization of feedback if applicable and means for application of an algorithm for analysis of an index of an object, for deriving the categorization of an object in accordance to a nomenclature of categories, entered in the computer device in advance and for automatic processing of the object and means for automatic positioning and price formation of an advertisement at the objects, localized in a common computer-based environment of connected computer devices, such as Internet, and application of an algorithm for processing of data for the users with user's signatures from the indexes of the objects and means for automatic positioning and price formation of an advertisement at the objects, localized in a common computer-based environment of connected computer devices, such as Internet, and application of an algorithm for comparing the characteristics contained in the user's signature based on the degree of conformity to the indexes of objects, which are being advertised, for deriving at the user's location of the most relevant advertised objects by the extent of usage by users with user's signatures having similar characteristics and means for creation of a feedback between the users with user's signatures of concrete objects in a common computer-based environment and their creators or operators offering the opportunity to use the data contained in the indexes of objects as a source of concrete information for making their contents more precise and application of an algorithm for automatic analysis of the data, contained in the indexes of objects and deriving of recommendations for specifying their content conforming to the specifics of the users with user's signatures.

* * * * *